Aug. 15, 1967

A. ASTER 3,335,648

CAMERA ATTACHMENT

Filed July 21, 1965

INVENTOR
ALEXANDER ASTER
BY
Kane, Dalsimer + Kane
ATTORNEYS

Aug. 15, 1967 A. ASTER 3,335,648
CAMERA ATTACHMENT
Filed July 21, 1965 2 Sheets-Sheet 2

INVENTOR
ALEXANDER ASTER
BY
Kane, Dalsimer & Kane
ATTORNEYS

3,335,648
CAMERA ATTACHMENT
Alexander Aster, 1558 Unionport Road,
Bronx, N.Y. 10462
Filed July 21, 1965, Ser. No. 473,601
2 Claims. (Cl. 95—1)

The present invention relates to photographic equipment and particularly to a lens-shade element provided with scale means adapted for attachment to a camera. So attached, adjustment of the camera for flash photography is made substantially automatic.

Picture taking with most present-day cameras, whether the subject matter be naturally or artificially lighted, generally involves the proper setting of various scales relative to suitable index marks. These are determined by existing factors, such as light intensity, speed of movement of the subject matter, subject matter distance, etc. It has been found that the complexities of present day picture taking with cameras requiring making the aforementioned adjustments individually seem formidable to the novice or amateur photographer. Further, the multiple adjustments are annoying to make and it is not too uncommon an occurrence that good pictures are missed, or improper results accrue, by all photographers due to the adjustment requirements, and the time to make them.

It is, therefore, an object of this invention to overcome the aforementioned problem by providing means adapted to be used cooperative with a camera to reduce the total adjustments in flash photography to a minimum thereby substantially to automate picture taking with flash lighting.

Other objects and advantages of the invention will be apparent when the following description is developed.

In a broad sense, the present invention, discloses an operating control means for automatically adjusting the lens aperture of a camera during flash photography. The control means comprises a shade element of a generally frusto-conical shape that is adapted to be received on and in co-axial alignment with the camera lens holder. The element is provided with an elongated arcuate opening at its base and a plurality of axially spaced scale means, one of which is an "f" stop scale. A pointer, connected to and supported by the "f" stop indicator on the lens holder, extends through the opening and is movable relative to the shade element so that the element may be rotated to bring each aperture opening on the respective "f" stop scales into registry. A connecting means is carried by the shade element to fasten the element to the lens holder releasably after the "f" stop settings are in registry. Movement of the pointed to a suitable position on another scale provides conjoint movement of the indicator to set the proper lens aperture of the camera.

The accompanying drawings both illustrate the new and improved lens shade element, and use like numerals to designate like parts throughout. In the drawings, FIGURE 1 is a side view of a lens holder of a conventional camera with the shade element mounted thereon;

Figure 1:
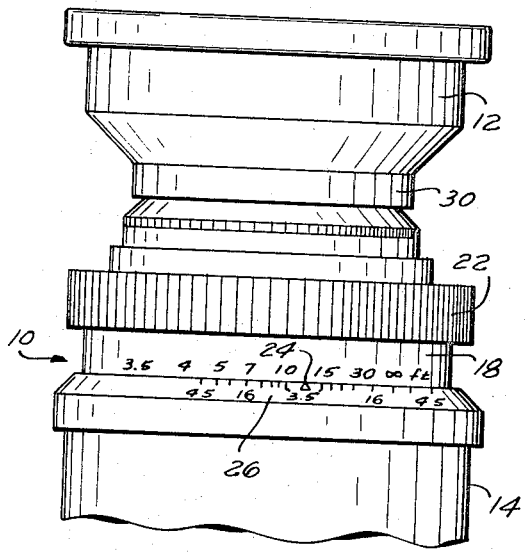
Figure 2:
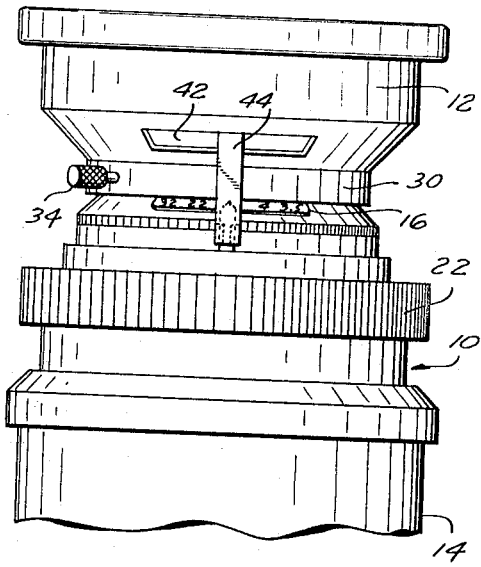
FIGURE 2 is a view similar to FIG. 1 but of substantially the opposite side of the holder and shade element.
Figure 3:
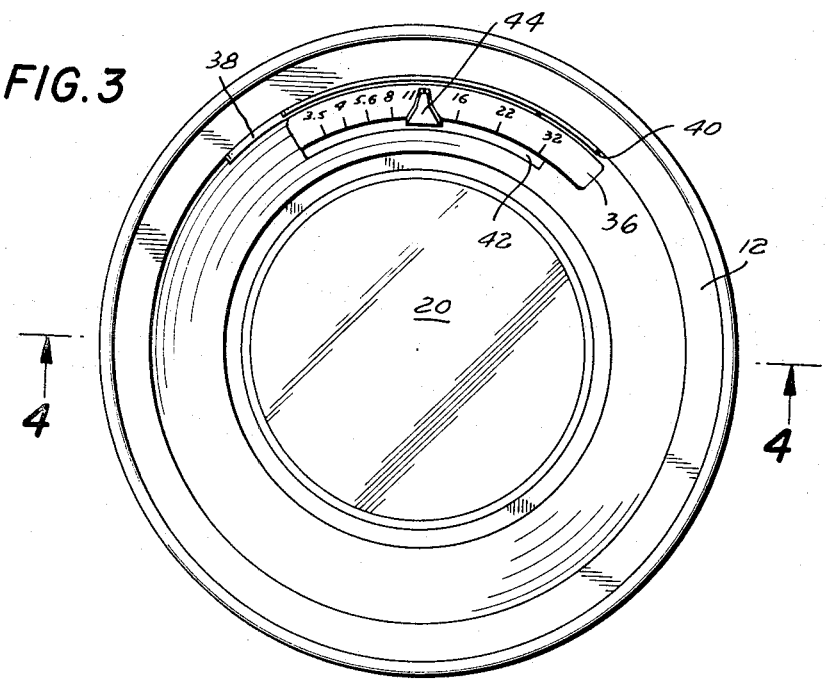
FIGURE 3 is an enlarged top plan view of the shade element of FIG. 1.

Referring now to the drawings and particularly to FIGS. 1 and 2, representing a conventional lens holder 10 with the improved shade element means 12 mounted thereon and in co-axial relation with the axis of the holder.

Figure 5:
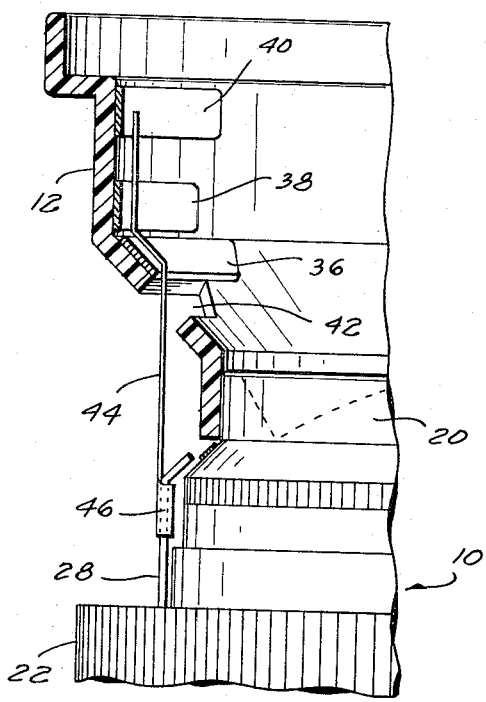

Generally, the lens holder comprises a supporting ring 14 that carries suitable means (not shown) at the base for removably securing the holder to the body enclosure (also not shown) of a camera carrying the shutter mechanism and film advance mechanism. As is apparent, the lens holder carries an optical system represented by the lens 20 (FIG. 5) and is connected to the enclosure so that the lens is co-axial with and longitudinally spaced from the shutter mechanism in the camera body.

The holder is provided with appropriate indicia scales on its peripheral surface as indicated by the numerals 16 and 18 representing, respectively, the "f" stop scale and the range scale. As noted in FIG. 1 the range may be adjusted through a range of distances, as for example from a minimum of 3.5 feet to a maximum at infinity. The lens aperture, as noted by the "f" stop scale in FIG. 2, is adjustable within maximum and minimum limits as illustrated by the setting $f{:}3.5$ representing the maximum diaphragm aperture opening and $f{:}32$ representing the minimum diaphragm aperture opening.

A knurled annular ring 22, having a radially inwardly concentrically spaced annular portion upon which the range indicia 18 appears, is rotationally mounted on the lens holder and is coupled to the range finder (not shown) of the camera in a manner as is well known in the art.

An index marker is provided adjacent the range indicia scale, and operatively associated with the scale. This element is positioned on the lens holder so that the indicated object distance may be established by rotation of the ring 22 and registering a particular range distance with the index mark.

A depth of field scale 26 is also provided on the lens holder. As is well known to amateur, as well as professional photographers, this form of scale indicates those objects on either side of the subject that will be in focus for any particular lens opening and subject matter distance. Therefore, illustratively assuming a lens opening of 5.6, if the subject matter is at a distance of approximately 13 feet from the camera, the depth of field will be approximately 10–20 feet and everything within this range will be in focus.

The lens holder is also provided with an "f" stop indicator 28 of an elongated substantially straight configuration. The indicator is coupled to the shutter aperture in any manner known to the camera art and is movable, through means (not shown), relative to the "f" stop indicia scale so that the upper obliquely bent portion of the indicator, which overlies the scale, may be positioned at any "f" stop number and consequently indicates the proper aperture opening.

The foregoing discussion has been presented to create a general background and without going into specifics provide an adequate description of a conventional lens holder and the various scales which must be properly adjusted and oriented to one another so as to assure oneself that his pictures will be properly exposed, in focus, and unblurred.

The shade element 12 is substantially of a frusto-conical configuration. It is preferably formed of a plastic material or metal thereby presenting a sturdy unit. The element terminates in an annular base 30 having a hole 32 formed therein. The hole is threaded and received a threaded set-screw 34 having an enlarged knurled head for easy manipulation of the screw.

Figure 4:
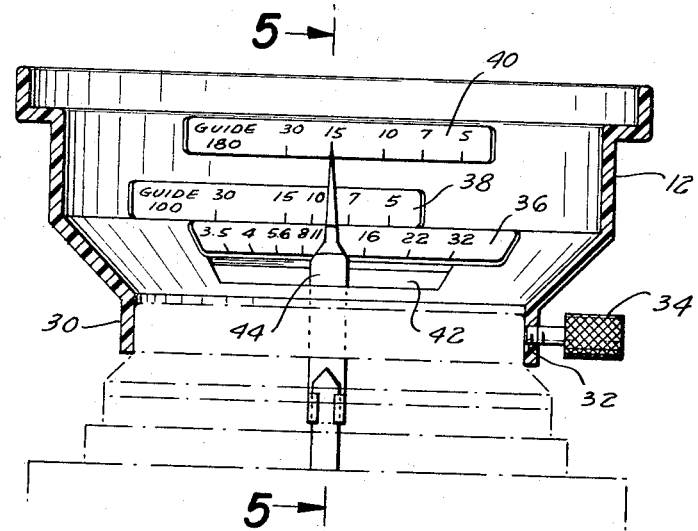
FIGURE 4 is a view in cross-section as seen along the line 4—4 in FIG. 3 and showing the scale means; and, FIGURE 5 is a sectional view of the shade element as seen along the line 5—5 in FIG. 4.

A plurality of scales 36, 38 and 40 representing an "f" stop scale and a pair of guide scales are provided on the inner surface of the shade element. The scales 38 and 40 can best be seen in FIG. 4 and respectively relate to color film (Guide 100) and black-white film (Guide 180). The scales display indicia in the form of numbers "30," "15," etc. The numbers, on each scale, are in predetermined orientation so that they represent subject matter distance from a flash source. Further, the numbers are aligned with individual "f" stop settings on the element.

While in the preferred showing of the shade element only a pair of guide scales is shown it should be apparent and kept in mind that additional guide scales, representing film characterized by a different emulsion speed, may be added or else replace the presently shown scales. Each scale is properly used with a single film type only. Thus, by the example shown, the present scales 38 and 40 are related to the most commonly used film type. The numbers are arranged on the scale in accordance with the known formula, that "$f$" stop setting is determined by dividing the guide number of the film by the subject-to-light-source distance in feet. Therefore, the scales 38 and 40 must be properly positioned on the shade element, that is, the numbers "30," etc., must be in alignment with a particular "$f$" stop setting.

Longitudinally spaced from the element 30 and the axial alignment with the scales thereon and the "$f$" stop indicator on the lens holder is an arcuate opening 42 that is approximately 90 degrees in length. The opening is formed in the tapered wall portion of the frusto-conical element and receives a pointer 44 therethrough. The pointer is connected to the vertical portion of the indicator by means of a clip 46 so that the pointer and indicator move as one unit.

The lens element is received on the lens holder as shown in the figures and rotated relative to the holder so that the indicator and the pointer are positioned above the same "$f$" stop setting. Thereafter the shade element is secured to the holder against movement by the set-screw 32.

An illustrative example of the use of the aforementioned shade element, assume that film represented by Guide 100 is being used and the subject-to-flash distance is 15 feet. The pointer is rotated relative to the shade element and positioned at "15" whereby the rotation of the indicator 28 and shutter mechanism to a lens aperture opening of $f:6.6$ is indicated by the scale 36 on the shade element. Therefore, by a single adjustment, due to the unique association of parts, the proper exposure opening is automatically adjusted without the need to individually adjust such aperture and a group of pictures may be rapidly taken with uniform results.

From the foregoing description, it is apparent that the invention provides a new and improved shade element and scale means that is adapted to be mounted on a conventional camera to substantially eliminate the complexities normally encountered in flash photography whereby the lens opening is automatically set.

While the invention has been particularly shown and described with reference to the preferred embodiment thereof, it will be understood by those skilled in the art that various changes in forms and details may be made therein without departing from the spirit and scope of the invention.

Having now described the invention, I claim:

1. An adjustment means for positively and automatically adjusting the lens aperture of a camera during flash photography comprising a substantially frusto-conical shade element having a cylindrical base portion received on a lens holder and a terminated cylindrical end portion of greater diameter than said base, said element having an arcuate opening of less than 90 degrees in length in the side wall adjacent said base and provided with scale means on the inner surface of the element and axially spaced from the opening, one of which scales represents conventional "$f$" stop settings, a pointer member movable within said arcuate opening having one end extended to a point adjacent the terminated end of the element, the other end of the pointer extended below said base and provided with clip structure for coupling the pointer with an "$f$" stop indicator on the lens holder so that said element may be rotated relative to the pointer to align respective "$f$" stop positions on both the element and lens holder, and means carried by said base portion for releasably connecting the element to the lens holder when in alignment whereby rotation of the pointer to a suitable position on the other scale means provides conjoint movement of the "$f$" stop indicator on the lens holder to set the proper lens aperture of the camera.

2. The adjustment means of claim 1 wherein the "$f$" stop scales are located on concentric circles whereby the "$f$" stop settings on the shade element are magnified.

References Cited
UNITED STATES PATENTS 2,241,596    5/1941    Guhl _____ 350—58
3,296,947    1/1967    Engelmann et al. _____ 95—1

NORTON ANSHER, *Primary Examiner.*

RICHARD M. SHEER, *Assistant Examiner.*